Dec. 16, 1952 B. COOPER 2,622,138
TOLL CHECKING SYSTEM
Filed Nov. 5, 1949 4 Sheets-Sheet 1

INVENTOR.
Benjamin Cooper
BY
attorney

Dec. 16, 1952   B. COOPER   2,622,138
TOLL CHECKING SYSTEM
Filed Nov. 5, 1949   4 Sheets-Sheet 2
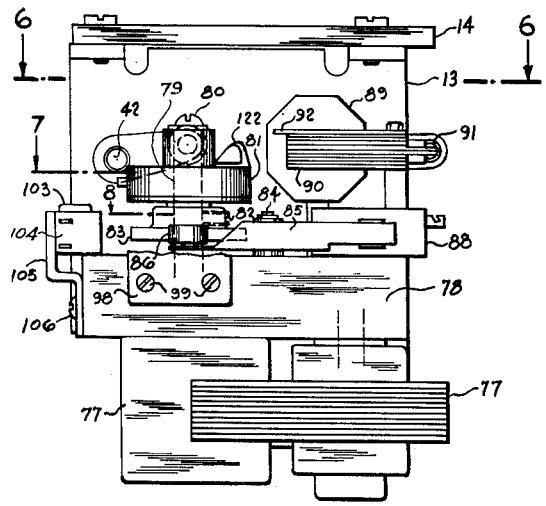
Fig-3
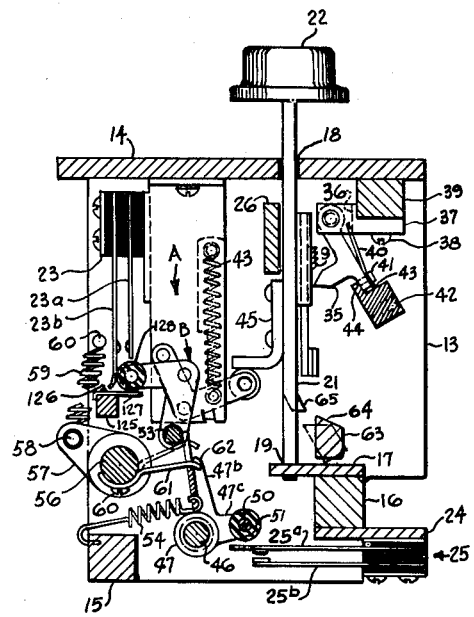
Fig-4
Fig-5
INVENTOR.
Benjamin Cooper
BY
J. B. Felshin
attorney Dec. 16, 1952   B. COOPER   2,622,138
TOLL CHECKING SYSTEM
Filed Nov. 5, 1949   4 Sheets-Sheet 3
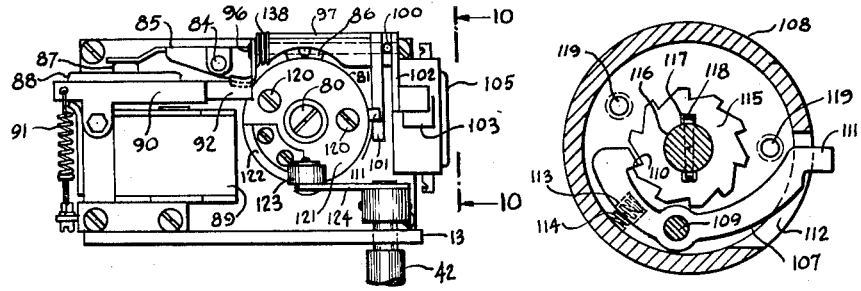
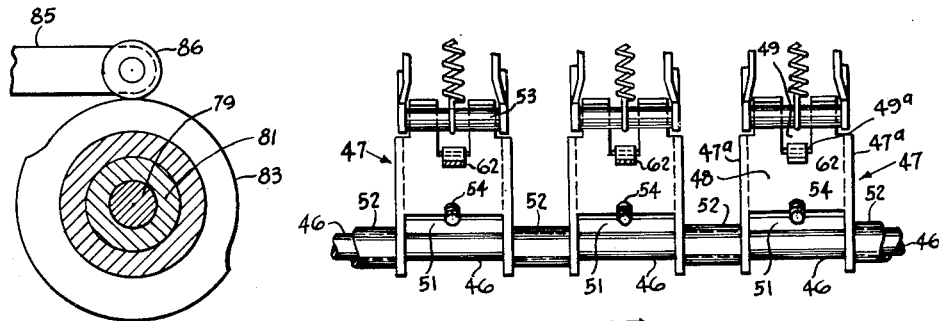
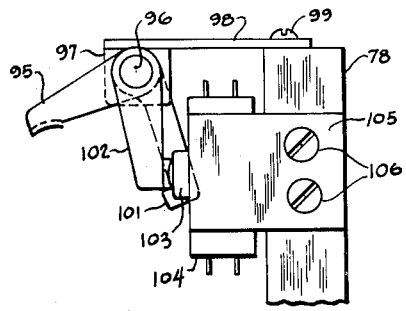
INVENTOR.
Benjamin Cooper Dec. 16, 1952  B. COOPER  2,622,138
TOLL CHECKING SYSTEM
Filed Nov. 5, 1949  4 Sheets-Sheet 4

INVENTOR.
Benjamin Cooper
BY
J. B. Felshin
attorney

Patented Dec. 16, 1952

2,622,138

UNITED STATES PATENT OFFICE 2,622,138

TOLL CHECKING SYSTEM

Benjamin Cooper, New York, N. Y.

Application November 5, 1949, Serial No. 125,755

18 Claims. (Cl. 177—311)

1

In applicant's U. S. Patent No. 2,293,935 issued August 25, 1942, there is described a keyboard having a plurality of push-button operated switches suitable for use in controlling electrical counters and indicating systems. The present invention relates to improvements in such a keyboard.

In modern vehicle toll checking systems, provision is made, by means of individual electric switches associated with each classification button of the keybox, to indicate visually the classification number and the fare charged in each separate toll collection transaction. To this end, indication lights in the form of numeral signals are usually located on the canopy above the toll collection booth so as to be easily readable at a distance when a toll transaction is registered. This arrangement serves the important function of allowing a supervisor, unobserved by the toll collector, opportunity to check on the collector's individual transactions. In ordinary toll collecting systems of this type, it is often difficult, or even impossible, for a supervisor to follow accurately the operator's transactions when they are being made at a rapid rate.

It is accordingly an object of this invention to provide, in a toll checking system of the type described, automatic timing means to insure that any given classification number and fare indication will remain lighted for at least a certain predetermined length of time.

It is another object of this invention to provide, in a system of the type described, automatic means to extinguish or "black out" the previous toll indication lights for a short time prior to the indication of the next successive toll registration.

It is a further object of this invention to provide, in a system of the character described, automatic means to hold any given keybox classification button in a depressed position until the timing cycle for its visual indication is completed.

It is a further object of this invention to provide, in a system of the type described, locking means to prevent any classification button from being depressed while the system is electrically deenergized.

A further object of this invention is to provide a strong, compact, rugged device of the character described, comprising comparatively few and simple parts, which shall be relatively inexpensive to manufacture, smooth and positive in operation, easy to assemble and disassemble, yet practical and efficient to a high degree in use.

Other objects of this invention will in part be obvious and in part hereinafter pointed out.

2

The invention accordingly consists in the features of construction, of combinations of elements and arrangements of parts which will be exemplified in the construction hereinafter described and of which the scope of this application will be indicated in the appended claims.

In the accompanying drawings, in which is shown one of the various possible illustrative embodiments of this invention, Fig. 1 is a front elevational view of a device embodying the invention;

Fig. 3 is a right end elevational view of a device embodying the invention. This view is also a top view of a timer unit incorporated in the invention;

Fig. 4 is a cross-sectional view taken on line 4—4 of Fig. 1;

Fig. 5 is a fragmentary cross-sectional view taken on line 5—5 of Fig. 1 showing the actuation of electric switches upon depressing a push-button;

Fig. 6 is a front view of a timer unit taken on line 6—6 of Fig. 3;

Fig. 7 is a cross-sectional view taken on line 7 of Fig. 3;

Fig. 8 is a cross-sectional view taken on line 8 of Fig. 3;

Fig. 9 is a cross-sectional view taken on line 9 of Fig. 5;

Fig. 10 is a fragmentary side elevational view taken on line 10—10 of Fig. 6;

Figure 1:
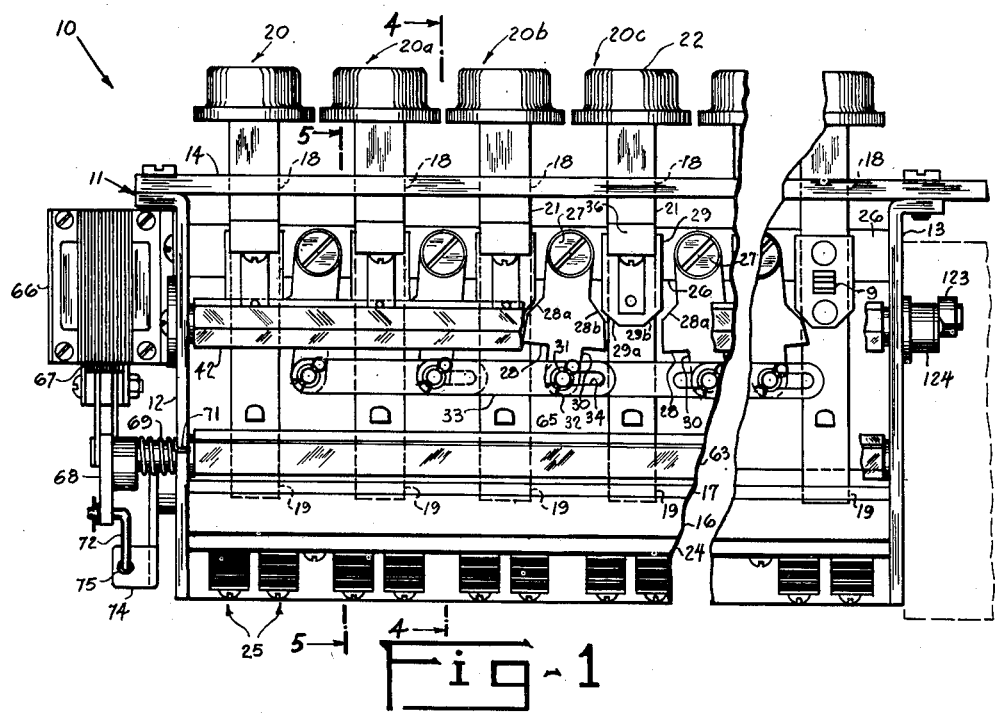

The description and function of the keyboard itself, over which the present invention is an improvement, is detailed in applicant's U. S. Patent No. 2,293,935 issued August 25, 1942. Therefore, only so much of its operation will be described herein as is necessary to disclose adequately the operation of the present invention. The construction and operation of a key identifier unit, referred to herein, is described in applicant's U. S. Patent No. 2,325,744 issued August 3, 1943.

Referring now in detail to the drawings, 10 designates a device embodying the invention. The device comprises a frame 11 having a top plate or panel 14 and parallel side walls 12 and 13 affixed thereto. Completing the frame are two square bars 15 and 16, rigidly and perpendicularly mounted between plates 12 and 13 at their lower corners. Said bars are positioned so as to have surfaces in planes parallel with plate 14. Bar 16 has affixed thereto, against its upper face and extending substantially along its entire length, a plate 17 greater in width than said bar and having surfaces parallel with panel 14. Panel 14 and plate 17 are provided with a plurality of aligned, registering slotted openings, 18 and 19.

On frame 11 is a plurality of similar parallel depressable plungers 20, 20a, 20b, 20c, etc., each comprising a plunger rod 21 slidably mounted within the aligned slotted openings 18 and 19 and having buttons 22 at the upper ends thereof. Each of said plungers has associated with it a toggle switch mechanism A mounted in a U-shaped member as shown in Figs. 4 and 5 and described and claimed in applicant's keybox patent referred to above. Said U-shaped members each have affixed to their front walls a pair of switches 23 comprising the normally open insulated spring fingers 23a and 23b and the normally open insulated spring fingers 23c and 23d.

As described in applicant's above-mentioned keyboard patent, normally open switches 23, by reason of the movement of insulated roller 128 away from said switch, close when the associated plunger is depressed and open when said plunger is released and moves back to its initial position.

Affixed to the underside of bar 16 is plate 24 parallel with panel 14. Affixed to said plate are a plurality of pairs of switches 25 comprising the normally open insulated spring fingers 25a and 25b, a pair of said switches being provided for each of said U-shaped members and said pair of switches being disposed on opposite sides of each opening 19.

Means is provided to prevent more than one of said plungers from being depressed at the same time. To this end, there is provided a vertical plate 26 between side plates 12 and 13, having a surface flush with aligned edges of the slot openings 18 and 19, upon which are pivoted, as by screws 27, webbed members 28 having shoulders 28a and 28b. Said webbed members, interposed between shoulder members 29, located on plunger rods 21 and having shoulders 29a and 29b for co-action therewith, have downwardly depending tongues 30. Said tongues have, at their lower end, a bearing stud 31 fitted with a cotter pin 32. Coaction of the webbed members is brought about by links 33. Each link has a bearing opening at one end and a slot 34 at its other end. Each link 33 is pivoted at one end on said bearing stud of one member 28 and connected by said slot and stud to adjacent member 28. The clearance between the shoulder members is sufficient only to permit one plunger to be depressed at a time.

Depressing push button 22 in Fig. 1 will slide shoulder 29a downwardly and over the shoulder 28b of the webbed member 28 to the left of the push button. Member 28 will rotate about its pivot 27 in a clockwise direction (Fig. 1), closing the clearance between shoulders 29b and 28a. This motion will be imparted to the other members through links 33. The webbed members 28 will also close the clearance between their shoulders 28a and the shoulders 29a affixed to rods 21. If the push button is held in its lowermost position, none of the other push buttons may be actuated because of the lack of clearance between the shoulders.

Should an attempt be made to depress two push buttons at the same time, neither one would be depressed far enough to perform its intended operations. The shoulders affixed to the rods 21 would slide downwardly about halfway on the shoulders of the webbed members and come to a stop when all the clearance is taken up. The webbed members would not rotate about the pivots to give sufficient clearance for the shoulders affixed to the rods 21.

Each plunger has a toothed rack part 9 affixed along the plunger rod 21. Cooperatively mounted with respect to said rack part, is a pawl 35 rotatably pivoted in cutout 36 of mounting member 37 (Fig. 4). Said mounting members are affixed, as by screws 38, in notches along a supporting bar 39 positioned against the underside of panel 14 and parallel therewith. Each of said pawls is furnished with a leaf spring 40 fastened to the free end of said pawl as by rivet 41 and restricted in compression at its open end due to its engagement with the inner edge of said cutout 36. Referring to Fig. 4, it is evident that the resultant force imposed by said spring upon said pawl will tend to rotate the pawl in a clockwise direction, i. e., in a direction for engagement of the tooth on the pawl with its cooperative rack when any one of the plungers is depressed.

There is further associated with said rack and panel mechanisms, a cooperative bar 42 rotatably and perpendicularly mounted between plates 12 and 13 and having a corner cutout portion 43 along its length. Face 44 of said cutout is normally in contact with the free ends of said pawls at the opposite side to which springs 40 are attached. Referring to Fig. 4, it is evident that clockwise rotational motion of bar 42 will impart a counter-clockwise rotational motion to said pawls against the urgency of spring 40, thereby releasing any one of the plungers 20 held in a depressed position by reason of engagement of said pawl with said rack and allowing said plunger to resume its normal upward position under the urgency of spring 43 associated with known toggle switch mechanism A.

It should be noted here that the lower end of foot 45 affixed to rod 21 serves to operate said toggle switch mechanism A; and the upper end of said foot, due to abutment against vertical plate 26, serves to limit the upward motion of said plunger.

Said rotatable bar 42 extends through plate 13 and, as is hereinafter described, is equipped and adapted to be actuated by a timer unit assembled on the outer said of said plate and indicated in Fig. 1 by the dotted enclosure.

Means is provided to close a pair of switches 25 upon depressing the associated plunger and to hold said switches closed after the return of said plunger to its initial position until they are released by depressing another plunger.

To this end, there is pivoted on shaft 46, perpendicularly mounted between side plates 12 and 13, a plurality of rocking members 47, each aligned with the pair of switches 25 (Figs. 4 and 9). Each of the rocking members 47 comprises a pair of aligned bell cranks 47a having arms 47b and 47c. The arms 47b of each pair of bell cranks are interconnected by a web 48. Said web has a notch 49 having a lower edge 49a. Rotatably mounted on the shaft 50 are the insulated rollers 51. The rocking members 47 are spaced upon the shaft 46 by sleeves 52 and are so spaced that the upper portion of webs 48 normally engages the rod 53 of the toggle mechanism so that the switches 25 will close upon rotation of said rocking members in a clockwise direction. Web portion 48 of each rocking member is normally held in engagement with rod 53 by coil spring 54 having one end connected to said web and the other end to bar 15 at a position opposite said web.

There is rotatably mounted and perpendicularly positioned between plates 12 and 13 and extending through plate 12 a rod 56 having a winged member 57 affixed thereto adjacent the inner side of plate 13. Said winged member has affixed thereto a pin 58. A coil spring 59 connects between said pin and a hole 60 in plate 13. Said spring exerts an upward force on winged member 57, urging said member and the rod 56 to rotate in a clockwise direction (Fig. 4).

Rigidly affixed to rod 56, as by screws 60, are the pawl fingers 61 aligned with notches 49 and having downwardly curved portions 62 adapted to pass through said notches. The pawl fingers are so affixed to said rod that under normal conditions, when the plungers are up, said fingers will pass through the notch 49 of the rocking member 47 and rest on the bottom edge 49a.

When plunger 22 is depressed, its toggle mechanism part B will be rotated in a counter-clockwise direction (Figs. 4 and 5), thereby urging rocking member 47 to rotate in a clockwise direction for closing the switches 25. The rotation of the rocking member 47 will require the pawl finger 61 to slip out of notch 29 and, due to the length of said pawl finger and the action of spring 59 on rod 56, the tip of said pawl finger will abut against the back of web 48 of said rocking member. When plunger 22 is thereafter released, part B will rotate in a clockwise direction but rocking member 47 will be held by pawl finger 61, as shown in Fig. 5, to retain switches 25 closed.

Switches 25 will be opened when one of the other plungers of the device is depressed to rotate its rocking member 47 in a clockwise direction. Edge 49a of notch 49 will slide along pawl 62 in said notch raising all the pawls against the action of spring 59. By the slight rotation of rod 56, the pawl finger 62 holding the one set of switches 25 closed will be raised enough to allow the rocking member 47 to return to its initial position due to the action of spring 54. The previously closed switches are thereby allowed to open. Meanwhile, another set of the switches 25 was closed and remained closed until released as aforedescribed.

The same plunger may be successively depressed as often as desired. The switches 25 will remain closed. The switches 23 alone will be actuated as hereinbefore described. The switches 25 will again be opened by depressing any one of the other plungers.

Means is further provided to open any switch 25 held closed as above and at the same time to prevent any of the buttons from being depressed whenever the keybox is locked out of service.

Figure 2:
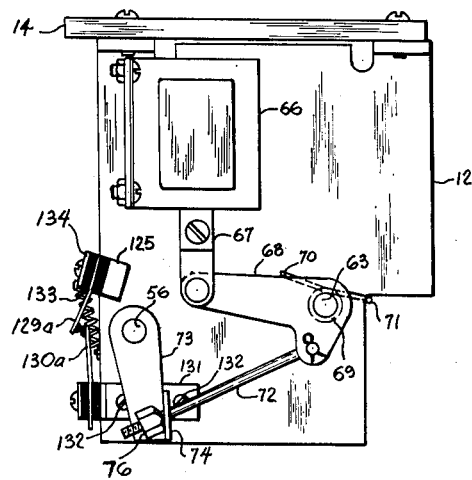
Fig. 2 is a left end elevational view of a device embodying the invention.

To this end, there is provided a locking bar 63 rotatably mounted perpendicularly between plates 12 and 13 and extending through end plate 12. Said locking bar has an edge 64 adapted to engage lips 65 on plungers 20 to prevent the depression of any of the plungers when said locking bar is in its locked position, as indicated by its dotted line representation in Fig. 4. There is further provided a solenoid 66 mounted on end plate 12 and having an armature 67 (Fig. 2). Said armature is pivotally connected to one arm of a bell crank 68 fitted to the extending end of said locking bar. Circumjacent said locking bar between the outer face of plate 12 and said bell crank, is a coil spring 69 having ends 70 and 71 held by the edges, respectively, of said bell crank and said plate. Spring 69, being under torsional stress, imparts a force to rotationally urge said locking bar 63 counter-clockwise into its locking position (Figs. 2 and 4). Pivotally connected with the other arm of bell crank 68 is a connecting rod 72 having its remote end loosely coupled to a crank arm 73 fixed to one end of rod 56. Said coupling comprises an outwardly extending ear 74 on said crank arm having a hole 75 through which said connecting rod passes. Threaded on said connecting rod is a nut 76 adjustable therealong. This coupling arrangement permits the crank arm and its attached rod 56 to be moved in a counter-clockwise direction by the action of bell crank 68, but at the same time allows said crank arm and its attached rod to rotate in a counterclockwise direction without imparting motion to said bell crank, since ear 74 is free to move along connecting rod 72 away from nut 76.

Now it is evident that when said solenoid is energized, corresponding to the condition when the keybox is unlocked and in operation, as is hereinafter described, bell crank 68 is moved in a clockwise direction, thus rotating attached locking bar 63 to a position allowing the clearance of lips 65 on plunger shaft 21. In this position a plunger may be depressed.

At the same time, as bell crank 68 rotates, it allows clockwise rotational motion of crank 73 and its connected rod 56 due to the extended position of connecting rod 72 and the action of spring 59. This rotation will, in effect, allow pawls 61 to assume their position of rest in notches 49.

Conversely, when solenoid 66 is de-energized, corresponding to the condition when the keybox is locked and out of operation, bell crank 68 is moved in a counter-clockwise direction, thus rotating attached locking bar 63 to a position for engagement with lips 65 on said plunger shaft and thereby preventing the depression of any plunger. At the same time, a counter-clockwise rotational motion will be imparted through connecting rod 72 to said crank and rod 56. This rotation will move pawls 61 away from rocking members 47 (see dotted line representation, Fig. 4) and allow any closed switches 25 to open as explained above.

Timing means is provided to hold automatically any keybox classification button in a depressed position until the timing cycle for its visual indication is completed.

To this end, there is assembled on the outer end of plate 13 an electromechanical timing unit (Figs. 3 and 6) adapted to control plunger release bar 42 and to control an electrical circuit, to be hereinafter described, associated with the keybox.

Figure 13:
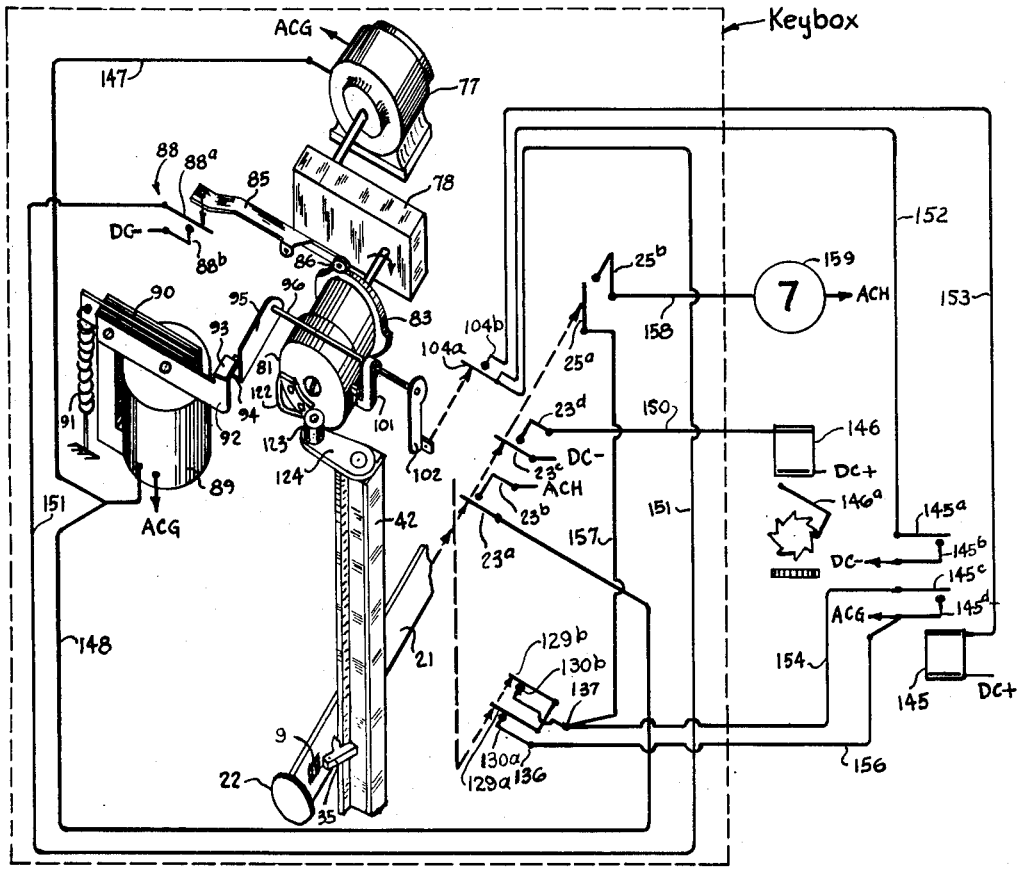
Fig. 13 is a schematic drawing showing the electrical circuit associated with the timer unit.

In the timing unit synchronous motor 77 is affixed to end plate 13 and is coupled to a gear reduction box 78 also affixed to plate 13 and having an output shaft 79 greatly reduced in speed from the speed of said input motor. Rotatably fitted on said output shaft, as by end screw 80, is a clutch mechanism 81 adapted, as hereinafter explained, to engage on occasion with said output shaft and to rotate unitedly therewith. Coaxially mounted, as by set screw 82, on the inner end of clutch 81 is a cam 83. Affixed to gear reduction box 78 at its inner side is a stud 84 upon which is rotatably mounted a pivot arm 85 holding a cam follower wheel 86 at one end. Said wheel is positioned in engagement with cam 83 so as to be cooperative therewith (Fig. 8). The remote end of said pivot arm rests against the operating button 87 of microswitch 88 and actuates said switch upon rotation of said cam as described hereinafter. There is further, as part of the timer unit, a solenoid 89 affixed to plate 13 and having a pivoted armature 90 normally held in an open or outward position in the usual manner by spring 91. Attached to and extending from the open end of said armature is an arm 92 having a flat portion 93 (Fig. 13). Said flat portion rests against a similar flat portion 94 on arm 95 and is adapted to move arm 95 thereby. Arm 95 is rigidly coupled to one end of a rod 96 rotatably mounted in a guide piece 97 having a flat portion 98 securely fixed to said gear box as by screws 99. Said rod has at its inner end and circumjacently disposed between arm 95 and guide piece 97, a helical spring 133 having one of its ends fixed against arm 95 and the other against said guide piece and under torsional stress so as to urge said rod to rotate in a clockwise direction (Fig. 10). The other end of rod 96 has affixed thereto, as by set screw 100, a unit comprising clutch release arm 101 and switch actuating arm 102.

It is evident that the downward motion of armature 90, upon energization of its solenoid, will impart through arm 92 to arm 95 a corresponding downward movement against the urgency of spring 133 resulting in a counter-clockwise rotational motion of rod 96 (Fig. 10). Consequently, switch actuation arm 102, being connected to said rod, will press against and operate button 103 of microswitch 104 affixed by bracket 105 to gear reduction box 78 as by screws 106. Also, release arm 101 will be moved to a position out of engagement with respect to pawl 107 associated with clutch 81 described below.

Clutch 81 comprises a housing 108 (Fig. 7) fitted with a pin 109 upon which is pivoted a pawl 107 having a toothed end 110 and a horizontal square end 111 extending through a slot 112 in the periphery of said housing. Near the toothed end of said pawl, there is in its outer edge a bore 113 adapted to hold seated therein one end of a spring 114. The other end of said spring is constrained in compression against the inner periphery of said housing, serving to urge said toothed end against a ratchet wheel 115 fixed to said output shaft.

Said ratchet wheel has an axial bore 116 and a diametrical slot 177. Said slot is adapted to register with and fit over a locking pin 118 diametrically positioned in output shaft 79 so that ratchet wheel 115 is held fixed relative to said output shaft. Said housing is fitted with threaded holes 119 to receive screws 120 adapted to hold in place a housing cover 121 (Fig. 6).

Since the normal direction of rotation of the output shaft is clockwise (Fig. 7), it is evident that when pawl 107 is not controlled at its outer end 111, clutch 81 and cam 83 will be rotated along with the output shaft, due to the toothed end 110 of said pawl being in engagement with said ratchet wheel.

However, when pawl 107 is held at its outer end 111 by engagement with release arm 101, a resulting motion of pawl 107 about pin 109 against the compressional force of spring 114 will move the toothed end of said pawl out of engagement with respect to ratchet wheel 115 and thereby release or uncouple said clutch 81 and cam 83 from the output shaft.

Clutch cover 121 has disposed on its outer face and along the circumference of a concentric circle in said cover, a cam part 122 adapted to actuate cam follower wheel 123 pivotally mounted on crank arm 124. Said crank arm is fixed to one end of bar 42 and controls the push button release mechanism as hereinbefore described.

Figure 11:
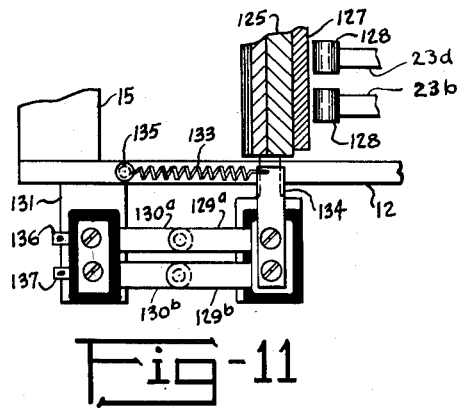
Fig. 11 is a fragmentary view showing the classification light auxiliary switch.

In connection with the electrical circuit for the keybox, described below, there is rotatably and perpendicularly located between plates 12 and 13 a switch actuation bar 125 (Figs. 2, 4 and 11). Said bar has affixed to its upper face, substantially along its entire length, as by screws 126, an inwardly extending plate 127. Said bar and plate are positioned to cooperate with insulated rollers 128 so that the movement of said rollers against plate 127 (as caused by depression of a plunger) will impart to said bar a clockwise rotational motion.

Switch actuation bar 125 extends through plate 12 and has mounted on it a pair of interconnected, insulated movable contact arms 129a and 129b. There is further provided for cooperation with said movable contact arms, a pair of fixed contact arms 130a and 130b insulated from, but mechanically mounted to, the outer side of a bracket 131 mounted, as by screws 132, to plate 12. Movable contact arms 129 are normally held in contact with fixed contact arms 130 by means of a spring 133 connected from plate 134 of the movable contact arm member to a pin 135 fixed in the edge of plate 12 at a position forward of said movable contact arms. Spring 133 will thus be seen (Fig. 2) to urge bar 125 in a counter-clockwise direction for engagement of said movable and fixed contact arms. In this position there will be presented a closed circuit at switch terminals 136 and 137. However, when any one of the plungers is pressed, the clockwise motion imparted to said bar will rotate said movable contact arms away from fixed contact arms 130a and 130b against the urgency of spring 133 resulting in an open circuit at terminals 136 and 137 for as long a period of time as the plunger is depressed.

Figure 12:
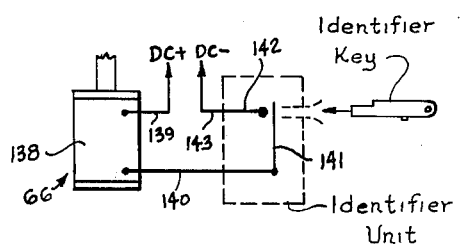
Fig. 12 is a schematic drawing showing the electrical circuit controlling the keyboard locking solenoid.

Fig. 12 shows the electrical circuit controlling the keybox locking mechanism. Locking relay 66 has a coil 138, one terminal of which is connected by wire 139 to a positive source of direct current supply. The other terminal of said coil is connected by wire 140 to the movable contact arm 141 of normally open switch 141, 142. Fixed contact arm 142 of said switch is connected by a wire 143 to the negative source of direct current supply. It is evident that when switch 141, 142 is closed, an energization circuit will be completed to solenoid 66 resulting in its actuation. As hereinbefore described, when relay 66 is energized the keybox is unlocked and capable of operation, and when said switch is thereafter opened, and the solenoid thereby de-energized, locking bar 63 will be moved to prevent depression of any plunger and at the same time rod 56 will be moved so that any locked-in classification light switch 25a, 25b will be released.

Although locking switch 141, 142 may be located at any convenient position, it has been practical to include this switch as part of the key identifier unit associated with the keybox so as to be operated by the use of an identifier key in the identifier unit as indicated in the drawing.

Fig. 13 shows schematically the electrical circuit (for one classification button) associated with the timer unit of the keybox. The dashed enclosure represents apparatus and wiring included in the keybox itself. Of the remaining equipment, the overhead classification indicator lights 159 are located above the associated toll collection booth, and the auxiliary relays 145 and the classification counter relays 146 may be located at a remote position in a "printing register" cabinet.

In the electrical circuit, motor 77 and solenoid 89 each have one terminal connected to a source of alternating current voltage ACG. The remaining terminals of said motor and solenoid are connected in parallel as by wire 147 and are also connected, as by wire 148, to movable contact arm 23a of switch 23. Fixed contact arm 23b of said switch is connected to a source of alternating current voltage ACH.

It is now evident that as long as switch 23a, 23b is closed, as it will be when its plunger is depressed, electrical circuits are completed for motor 77 and solenoid 89 (being in parallel). These circuits are: from ACH through switch 23a, 23b, wire 148, wire 147, motor 77 to ACG; and from ACH through switch 23a, 23b, wire 148, solenoid 89 to ACG.

Switch 23c, 23d, normally open but adapted to be closed when its associated push-button is depressed, has its movable contact arm 23c connected to a source of negative direct current voltage. Fixed contact arm 23d of said switch is connected by wire 150 to one terminal of classification counter relay 146, the other terminal of said relay being connected to the source of positive direct current voltage. When energized, relay 146 is adapted to move armature 146a so as to add a count to its associated printing wheels through a mechanism known to those versed in the art.

It is evident that whenever switch 23c, 23d is closed, as by depressing its associated plunger, a circuit will be completed through the relay from the negative source of direct current supply, through switch 23c, 23d, wire 150, relay 146 to the positive source of direct current voltage supply, thereby energizing said relay and adding a count on its printing wheels.

Cam-actuated switch 88, having movable contact arm 88a and fixed contact arm 88b, is normally open but adapted to be closed for a period of time as clutch mechanism 81 and the integrally connected cam 83 are rotated. Said switch has its fixed contact arm 88b connected to the negative source of direct current voltage. Said switch has its movable contact arm 88a connected, as by wire 151, to the movable contact arm 104a of normally open switch 104. Switch 104 has a fixed contact arm 104b and is adapted to be closed through the action of switch actuation arm 102. Movable contact arm 104a is connected also, as by wire 152, to a movable switch arm 145a associated with auxiliary relay 145. Fixed contact arm 104b is connected as by wire 153 to one energization terminal of said auxiliary relay. The other terminal of said relay is connected to the positive source of direct current voltage supply.

Relay 145 has associated with it two pairs of normally open switches; 145a, 145b and 145c, 145d, adapted to be closed when said relay is energized. Fixed contact arm 145b is connected to a source of negative direct current voltage. Movable contact arm 145c connects by wire 154 to contact terminal 137 of classification light auxiliary switch 136, 137 and thence by wire 157 to movable contact arm 25a of lock-in switch 25 associated with the plunger. Said lock-in switch is normally open but adapted to be closed and to be held closed, in the manner hereinbefore described, by the action of the plunger. Contact arm 25b of said switch connects as by wire 158 to one terminal of overhead classification indicator light 159. The other terminal of said indicator light is connected to a source of alternating current voltage ACH.

Thus, it is evident that when switch 25 and either of switches 136, 137 or 145c, 145d are closed-circuited, the associated overhead classification indicator light 159 will be illuminated. This circuit is seen to be from the source of alternating current voltage supply ACH, through the indicator light, wire 158, switch 25, wire 157 and either through wire 154 and closed switch 145c, 145d to the source of alternating current voltage supply ACG, or through closed switch 136, 137 and wire 156 to the source of alternating current voltage supply ACG.

A complete cycle of operation of the keybox is as follows: The toll collector, upon opening the toll lane for traffic, turns his particular identifier key in the key identifier unit, thereby closing the switch 141, 142 included therein. Closing said switch operates the keybox unlocking circuit, as outlined above, unlocking the push buttons for operation.

Thereafter, upon completion of a toll collection transaction, the operator will push the particular plunger corresponding with the transaction involved. Upon depressing the plunger, switch 136, 137 will be opened and switches 23a, 23b, 23c, 23d and 25a, 25b will be closed. Pawl 35 will automatically retain the plunger in for the following cycle of operation during which time no other plunger can be depressed, as hereinbefore described.

The closure of switch 23a, 23b in the energizing circuit of motor 77 and relay 89 starts the motor and moves release arm 101 out of engagement with pawl 107 thereby allowing the clutch mechanism 81 to be turned. At the same time, switch actuation arm 102 will move to close associated switch 104. Just before clutch mechanism 81 is about to complete one revolution (a complete revolution taking, for example, 1½ seconds), cam part 122, in moving into engagement with the follower wheel 123 will thereby actuate release bar 44, releasing the plunger. Upon the push button being released, switch 23a, 23b will open, thereby open-circuiting relay 89 and motor 77. Clutch release arm 101 will fall into place and engage with pawl 107, thus disengaging and stopping clutch mechanism 81 as the open-circuited motor coasts to a full stop.

Also, when the plunger is released, switch 23c, 23d will open-circuit and switch 136, 137 will close-circuit. However, as hereinbefore pointed out, switch 25 will remain closed until any plunger is again depressed or until the keybox is locked.

It is now apparent that for each time a plunger is depressed, its associated classification counter will be actuated once, thereby properly adding one count for each depression of the push button.

When a plunger is first depressed, it will trip open any previously locked-in switch 25 and thereby open-circuit or "black out" the preceding classification indicator light. At the same time, since switches 88; 136, 137 and 145c, 145d (relay 145 being de-energized) are open, the classification indicator light for the push button depressed will not be energized. But when cam 83 has rotated to a position at which switch 88 is closed (this occurring, for instance, 3/4 of a second after the timer mechanism has begun to operate), a source of negative voltage supply will be furnished through switches 88 and 104 to relay 145, energizing it and thereby completing a circuit for the classification indicator light through switches 25; 145c, 145d to the alternating current voltage source ACG.

Thereafter, when the timer has completed its cycle and the push button is released, the classification indicator light will remain energized through now closed switch 136, 137 even though relay 145 has become de-energized and broken the circuit through its switch contact arms 145c, 145d. Moreover, since switch 136, 137 is faster acting than relay 145 and its associated switch 145c, 145d, it will close before the relay switch opens, thereby serving to prevent flickering of the classification indicator light as the energization circuit is changed from one switch to the other.

It should be noted here, that even if a plunger be depressed and held in beyond the 1½ second cycle, no extra registrations will be indicated. This is due to the fact that after switch 104 is closed, energizing relay 145, said relay remains energized through the electrically locked-in switch 145a, 145b. Thus the circuit from the positive source of direct current voltage supply through relay 145, wire 153, switch 104, wire 152, switch 145a, 145b to the negative source of direct current voltage supply, will keep said relay energized until switch 104 is thereafter opened, even though cam switch 88 is repeatedly opening and closing. Relay 145, being continually closed, will therefore keep an uninterrupted energization circuit furnished to the classification indicator light.

It will thus be seen, that there is provided a device in which the several objects of this invention are achieved and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

Having thus described my invention, I claim as new and desire to secure by Letters Patent:

1. An electric device, a manually operated member, means to initiate energization of said electric device automatically at a substantial predetermined period after operating said manually operated member, a second manually operated member, means to deenergize said electric device upon actuation of said second manual member, a second electric device, and means to initiate energization of the second electric device at a substantial predetermined time after actuation of said second manually operated member, means to ensure energization of each electric device upon operating the manual member associated therewith, said last means including a switch associated with each manually operated member adapted to be actuated thereby upon operation of said member, and means to hold the switch in operated condition for a predetermined time.

2. An electric device, a manually operated member, means to energize said electric device automatically at a predetermined period after operating said manually operated member, means to retain said manually operated member in operated condition, means to automatically return the manually operated member to normal condition at a predetermined time, greater than said first predetermined time, after it is operated, means to retain said electric device energized after said manually operated member is returned to normal, a second manually operated member, means to de-energize said electric device upon actuation of said second manually operated member, and means to prevent deenergization of said electric device, until it has been energized for at least a predetermined period of time.

3. An electric device, a manually operated member, means to energize said electric device automatically at a predetermined period after operating said manually operated member, means to retain said manually operated member in operated condition, means to automatically return the manually operated member to normal condition at a predetermined time, greater than said first predetermined time, after it is operated, means to retain said electric device energized after said manually operated member is returned to normal, a second manually operated member, means to de-energize said electric device upon actuation of said second manually operated member, a second electric device, means to energize the second electric device at a predetermined time after actuation of said second manually operated member, and means to prevent deenergization of said first electric device until it has been energized for at least a predetermined period of time.

4. An electric device, a manually operated member, means to energize said electric device automatically at a predetermined period after operating said manually operated member, means to retain said manually operated member in operated condition, means to automatically return the manually operated member to normal condition at a predetermined time, greater than said first predetermined time, after it is operated, a second manually operated member, means to de-energize said electric device upon actuation of said second manually operated member, a second electric device, means to energize the second electric device at a predetermined time after actuation of said second manually operated member, and means to prevent actuation of said second manually operated member before said first manually operated member is returned to normal position.

5. In a keybox, the combination comprising an electric signal light, a manually operated key, means to initiate energization of said signal light automatically at a predetermined time after operating said key, a second manually operated key, means to de-energize said signal light upon operation of said second manually operated key, a second electric signal light, means to initiate energization of said second signal light at a predetermined time after operation of said second manually operated key, means to prevent de-energization of said first signal light until it has been energized for at least a predetermined period of time, means to ensure energization of any signal light upon operation of the manual key associated therewith, said last means including a switch associated with each manually operated key adapted to be actuated thereby upon operating said key, and means for holding the switch in actuated condition for a predetermined time.

6. In a keybox, the combination comprising an electric signal light, a manually operated key, means to energize said signal light automatically at a predetermined time after operating said key, means to retain said key in operated condition, means to automatically return said manually operated key to normal position at a predetermined time, greater than said first predetermined time, after it is operated, means to retain said electric signal light energized after the return of said key to normal, a second manually operated key and means to de-energize said electric signal light upon operation of said second manually operated key.

7. In a keybox, the combination comprising an electric signal light, a manually operated key, means to energize said signal light automatically at a predetermined time after operating said key, means to retain said key in operated condition, means to automatically return said manually operated key to normal position at a predetermined time, greater than said first predetermined time, after it is operated, means to retain said signal light energized after the return of said key to normal, a second manually operated key, means to de-energize said electric signal light upon operation of said second manually operated key, a second electric signal light means to energize said second signal light at a predetermined length of time after operation of said second manually operated key, and means to prevent operation of said second manually operated key for a predetermined period after said first electric signal light has become energized.

8. A plurality of depressable keys, timing means to hold any one of said keys in depressed position for a predetermined length of time, means controlled by the depression of said key to release said last means at the end of said predetermined period of time, a plurality of electric signal lights one for each of said keys, energizing circuits for each of said signal lights, controlled by depressing their respective keys, means controlled by said timing means to de-energize said circuit for a portion of the predetermined length of time during which said key is held depressed by said timing means, and to then energize said circuit, means to prevent de-energization of said circuit until it has been energized for at least a predetermined period of time, means to ensure energization of the respective circuits upon depressing the key associated therewith, said last means including a switch associated with each key adapted to be actuated thereby upon depressing said key, and means for holding the switch in actuated condition for a predetermined time.

9. An electric signal, an energizing circuit for said signal, a switch in said circuit, controlling said circuit, a manually operated key to actuate said switch, timing means, controlled by said manually operated key to hold said key in operated position for a predetermined length of time, means to return said key to normal position at the end of said predetermined length of time, means to maintain said switch in actuated position upon the return of said key to normal position, and means controlled by said timing means to retain said circuit in de-energized condition for a predetermined period shorter than said predetermined length of time and starting with the operation of said key, notwithstanding actuation of said switch, and to thereafter energize said circuit to operate said signal.

10. An electric signal, an energizing circuit for said signal, a switch in said circuit, controlling said circuit, a manually operated key to actuate said switch, timing means, controlled by said manually operated key to hold said key in operated position for a predetermined length of time, means to return said key to normal position at the end of said predetermined length of time, means to maintain said switch in actuated position upon the return of said key to normal position, means controlled by said timing means to retain said circuit in de-energized condition for a predetermined period shorter than said predetermined length of time and starting with the operation of said key, notwithstanding actuation of said switch, and to hereafter energize said circuit to operate said signal, a second manually operated key, and means controlled by the operation of said second manually operated key to return said switch to de-actuated position, and means to prevent actuation of the second key until the first key is returned to normal.

11. An electric signal, an energizing circuit for said signal, including a first normally open switch and a second normally open switch, a control circuit for said energizing circuit including a relay, an energizing circuit for said relay, and a third normally open switch controlled by said relay, said third switch being connected in parallel with said second switch, a manually operated key to actuate said first and second switches, timing means controlled by said manually operated key to hold said key in operated position for a predetermined length of time, a fourth normally open switch in said relay energizing circuit controlled by said timing means to be actuated during said predetermined length of time, a fifth normally open switch in said relay circuit controlled by said timing means to be actuated for a period shorter than said predetermined length of time, a sixth normally open switch controlled by said relay and connected to electrically lock in said relay energizing circuit when said fourth switch is actuated, means to release said manually operated key at the end of said predetermined length of time, and means to retain said first switch in actuated position upon the release of said manually operated key.

12. An electric signal, an energizing circuit for said signal, including a first normally open switch and a second normally open switch, a control circuit for said energizing circuit including a relay, an energizing circuit for said relay, a third normally open switch controlled by said relay, said third switch being connected in parallel with said second switch, a manually operated key to actuate said first and second switches, timing means controlled by said manually operated key to hold said key in operated position for a predetermined length of time, a fourth normally open switch in said relay energizing circuit controlled by said timing means to be actuated during said predetermined length of time, a fifth normally open switch in said relay circuit controlled by said timing means to be actuated for a period shorter than said predetermined length of time, a sixth normally open switch controlled by said relay and connected to electrically lock in said relay energizing circuit when said fourth switch is actuated, means to release said manually operated key, at the end of said predetermined length of time, means to retain said first switch in actuated position upon the release of said manually operated key, a second manually operated key, and means controlled by the operation of said second manually operated key to return said first switch to deactuated position.

13. In a toll checking system, a cyclically operable timing mechanism, an indicating means, a manually operated member actuable to initiate operation of said timing mechanism, means to energize said indicating means, means to delay the energization of said indicating means for a predetermined portion of the timing mechanism cycle, means to return the manually operated member to normal position during said cycle, and means to prevent re-actuation of said manually operated member until said timing mechanism cycle is completed.

14. A plurality of depressable keys, a switch associated with each key, means for each key to operate its switch, timing means to hold any one of said operated switches in operated position for a predetermined length of time, means controlled by the operation of any operated switch to release its operating means, an electric signal light associated with each switch, an energizing circuit for each of said signal lights controlled by the operation of the key for the switch associated therewith, and means controlled by said timing means to deenergize said circuit for a portion only of the predetermined length of time.

15. In a toll checking system, a timing mechanism operable for a predetermined period of time, a plurality of indicating means, a manually operated member associated with each indicating means, means to initiate operation of a timing mechanism upon actuating any of said manually operated members, means to energize an indicating means associated with any actuated manually operated member, means to delay the energization of said associated indicating means for a predetermined portion of the time during which said timing means is operated, means to return any actuated manually operated member to normal position, and means to prevent actuation of any other manually operated member during said predetermined period.

16. In a toll checking system, a plurality of manually operable members, an electrically operated signal means associated with each member, means to actuate the signal means associated with one of said members, a predetermined time after actuating said member and to maintain said signal means in operated condition, means to deactuate the actuated signal means associated with said first member a similar predetermined time after actuation of said other member, and means to prevent actuation of said other member for a predetermined period after said first signal means has become actuated, means to ensure actuation of said electrically operated signal means upon operation of the manual member associated therewith, said last means including a switch associated with each manually operable member adapted to be actuated thereby upon depressing said member, and means for holding the switch in actuated condition for a predetermined time.

17. In a toll checking system, a depressable member, an electric signal associated therewith, means to energize the signal a predetermined time after depressing the depressable member, and means to prevent deenergization of said signal for another predetermined period after it is energized, and means to return the depressable member to normal condition, means to ensure energization of said signal upon depressing said depressable member, said last means including a switch associated with said depressable member adapted to be actuated thereby upon depressing said member, and means for holding the switch in actuated condition for a predetermined time.

18. In a toll checking system, a depressable member, an electric signal associated therewith, means to energize the signal a predetermined time after depressing the depressable member, and means to prevent deenergization of said signal for another predetermined period after it is energized, and means to return the depressable member to normal condition, a second depressable member, a second signal associated with said second member, means to energize the second signal a predetermined time similar to the first predetermined time after depressing the second member, and means to deenergize the first signal upon depressing the second depressable member, means to ensure energization of the signal associated with each depressable member upon depressing said member, said last means including a switch associated with each depressable member adapted to be actuated thereby upon depressing said member, and means for holding the switch in actuated condition for a predetermined time.

BENJAMIN COOPER.

REFERENCES CITED

The following references are of record in the file of this patent:

UNITED STATES PATENTS

| Number | Name | Date |
|---|---|---|
| 1,164,737 | Mead | Dec. 21, 1915 |
| 1,707,909 | Gullong | Apr. 2, 1929 |
| 2,364,937 | Bauer | Dec. 12, 1944 |

FOREIGN PATENTS

| Number | Country | Date |
|---|---|---|
| 108,213 | Great Britain | Aug. 2, 1917 |